United States Patent [19]
Robbins

[11] 3,857,601
[45] Dec. 31, 1974

[54] CANOPY FOR PICKUP TRUCKS

[76] Inventor: Joseph W. Robbins, 1395 W. Jones Greek Rd., Grants Pass, Oreg. 97526

[22] Filed: Mar. 8, 1973

[21] Appl. No.: 339,140

[52] U.S. Cl. .............. 296/10, 296/100, 296/137 B
[51] Int. Cl. ............................................ B60p 7/02
[58] Field of Search ...... 296/10, 100, 137 R, 137 B, 296/23 MC, 35 R, 76

[56] References Cited
UNITED STATES PATENTS

| | | | |
|---|---|---|---|
| 2,946,624 | 7/1960 | Barenyi | 296/137 |
| 3,118,701 | 1/1964 | Peras | 296/137 |
| 3,185,266 | 5/1965 | Hofmeister | 296/137 |
| 3,508,784 | 4/1970 | Small | 296/35 |
| 3,525,687 | 8/1970 | Ross et al. | 296/76 |
| 3,536,352 | 10/1970 | Beckley | 296/100 |

FOREIGN PATENTS OR APPLICATIONS 963,078  6/1950  France ............................. 296/137

*Primary Examiner*—Robert J. Spar
*Assistant Examiner*—Ross Weaver
*Attorney, Agent, or Firm*—Clarence M. Crews

[57] ABSTRACT

A novel, highly ornamental, weather-tight, rigid, canopy for automotive vehicles having trays (commonly referred to as pickup trucks) is provided, having top, side and rear walls composed almost exclusively of tough, optically transparent, tinted plastic and a front wall of clear, untinted, optically transparent plastic having the same qualities of toughness and strength as the other walls. Appropriate means are provided for cushioning and sealing marginal portions of the canopy and a rear canopy window, which window is made swingable for ingress and egress.

1 Claim, 6 Drawing Figures

PATENTED DEC 31 1974 3,857,601
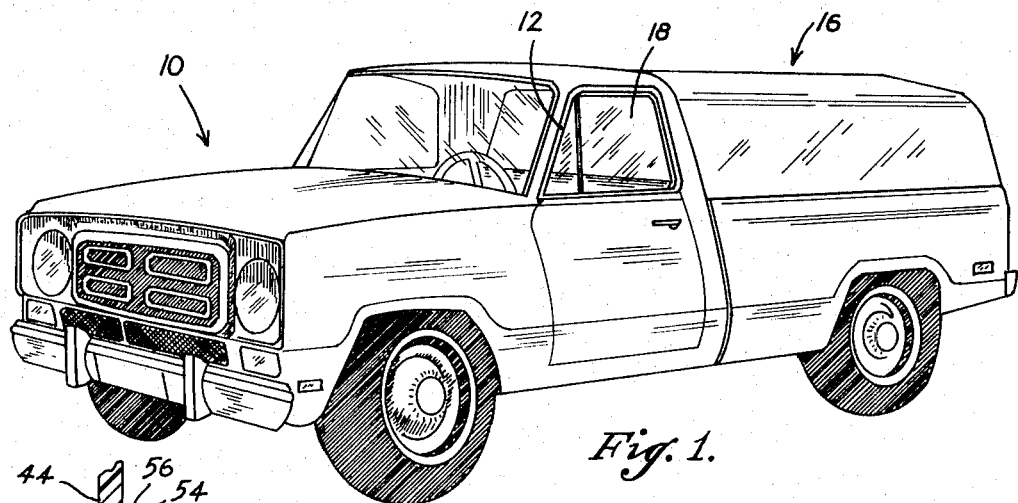
Fig. 1.
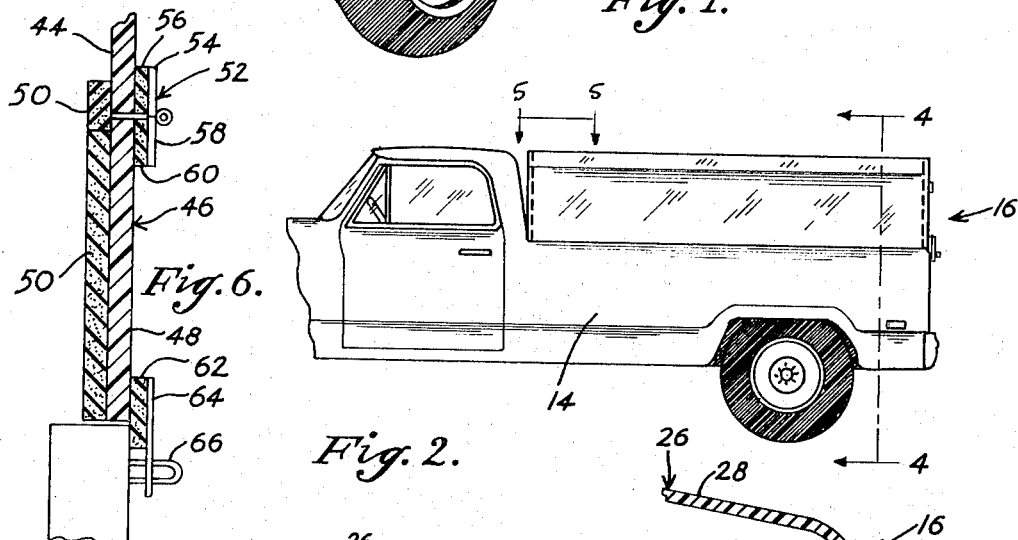
Fig. 6.
Fig. 2.
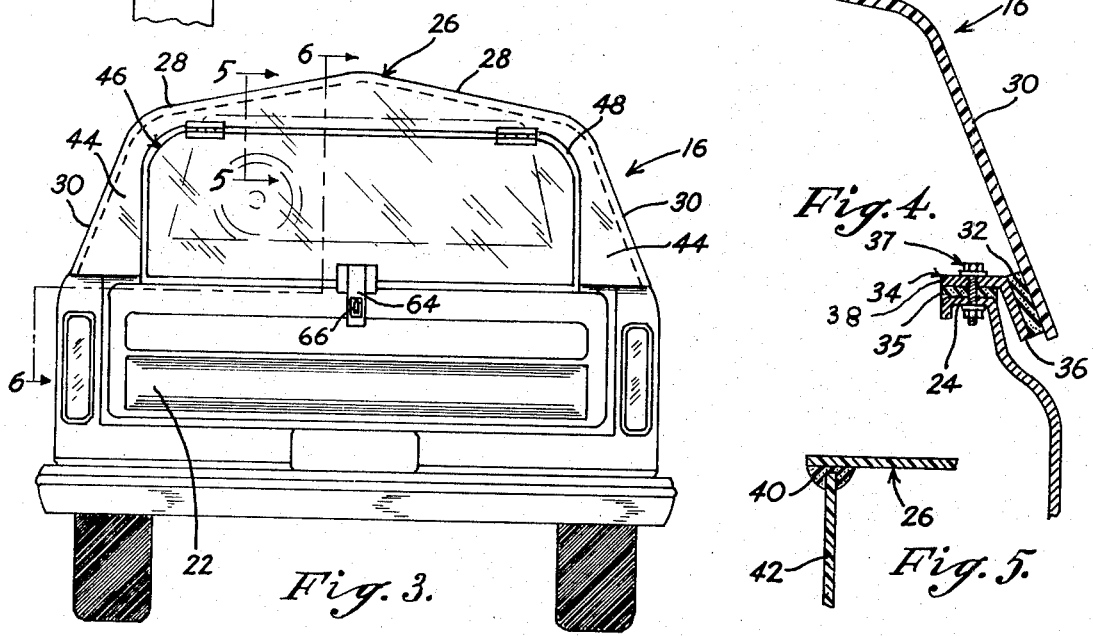
Fig. 4.
Fig. 3.
Fig. 5.

CANOPY FOR PICKUP TRUCKS

This invention relates to a novel and highly decorative, rigid, canopy for the rear beds of automotive vehicles, more notably pickup trucks, whose primary purpose is to provide a weather-tight enclosure while preserving clear substantially unobstructed vision for the driver and for occupants housed beneath the canopy. This is done by using optically transparent materials for wall construction rather than the commonly used opaque materials such as wood, metal, fiber-reinforced plastic, or fabric, whose opaque nature tends to create hazardous blind spots for the driver. My novel canopy is designed to protect the contents and/or occupants of the pickup tray from prying eyes and from wind, rain and other adverse conditions. In suitable circumstances, the canopy can serve to provide sleeping quarters for persons or pets. although the side, top and rear walls of the canopy are composed of material which can be accurately described as transparent, the fact that these walls are tinted means that some light is absorbed by them. If, therefore, at the end of the day's run the rear window of the vehicle cab is covered by a screen or blanket, it will necessarily be darker within the canopy than it is outside. In such circumstances persons within the canopy may be able to see out, but persons outside the canopy cannot see in.

Most desirably, but not necessarily, both the sides and top of the canopy are composed of a single piece of thermoformed, tough, durable, resilient, optically transparent, tinted, plastic sheet material with the rear wall and window composed chiefly of the same transparent material and the front wall composed chiefly of an untinted material of the same nature. While the preferred plastic is General Electric's polycarbonate sheeting known as "Lexan, " this invention is not limited to such material but may employ my transparent plastics whose physical properties are suitable for a canopy as herein described.

It is a further feature that the plastic wall-forming members are connected to one another and to the vehicle in a cushioned and shock-absorbing manner which obviates all need for providing weakening perforations in the plastic material.

It is a still further feature that a hinged rear window of transparent, tinted plastic is provided which is cushioned against contact with the tail-gate and with other unyielding parts of the canopy, and again without resort to weakening perforations in the plastic material.

Other objects and advantages will hereinafter appear.

In the drawing froming part of this specification,

FIG. 1 is a perspective view in elevation of a pickup truck to which a practical and advantageous form of canopy, illustrative of the invention, is applied;

FIG. 2 is a view in side elevation, partly broken away, of the structure of FIG. 1;

FIG. 3 is a view in rear elevation of the structure of FIG. 1;

FIG. 4 is a fragmentary, detail, sectional view taken in the region indicated by the arrows 4—4 of FIG. 3 and in the plane indicated by the section line 4—4 of FIG. 2;

FIG. 5 is a fragmentary sectional view taken in the region indicated by the arrows 5—5 of FIG. 2 and in the plane indicated by the section line 5—5 of FIG. 3; and FIG. 6 is a cross-sectional view through the rear end of the canopy and tail-gate, showing the hinge, lock and sealing arrangement of the rear window.

The vehicle 10 of FIGS. 1 to 3 is a conventional pickup truck having all the standard, readily recognized equipment that requires no detail description. Of principal concern in connection with the present description are the cab 12 in which the driver sits and the tray 14 to which my novel canopy 16 is attached.

It may be noted at the outset that the cab is equipped with an overhead rear view mirror (not shown) and a fixed transparent rear window 18, enabling the operator to see into and through the canopy 16. The vehicle includes at the rear end of the tray 14 an outwardly swinging tail-gate 22. The tray is bordered along its sides by inturned flanges 24 and generally by a horizontal surface at the front (not shown). My novel canopy 16 is removably mounted in sealed relation on the horizontal, or generally horizontal, surfaces which border the tray, being firmly attached to the flanges 24.

The canopy 16 consists chiefly of a main body member 26 which is an integral member including slightly sloping top or roof portions 28 and sharply sloping side portions 30. The member 26 is desirably composed of strong, tough, durable, transparent, tinted plastic, preferably General Electric's polycarbonate known as "Lexan," of the configuration shown. Along each inner lower margin a continuous strip 32 composed of cushioning, resilient elastomer such as rubber (preferably neoprene) is adhesively applied, and to the inner face of each such strip an angle bar 34 is adhesively applied. The angle bar has a downturned web 36 through which adhesive union to the cushioning strip 32 is effected, and a horizontal web 38, to the lower face of which an elastomer strip 35 is affixed by adhesive. The strip 35 together with the web 38 is adapted to rest upon, and to be secured to, one of the tray flanges 24 by bolt and nut combinations 37.

The cushioning material preferred for this service and for other analogous services to be described is neoprene because of its strength and durability. The bonding agent or adhesive employed is desirably a cyanoacrylate monomer in liquid form, which is known as "Permabond," and which reacts with the surfaces to be joined under simple contact and pressure to form a polymerized solid, anionic in nature, whose bonding with the materials herein described is fast and durable.

At the forward end of the canopy, along the inner face of member 26, a channeled strip of cushioning and joining material 40, desirably neoprene, is continuously, marginally adhered. A flat front panel 42 of appropriate shape, composed of clear transparent plastic, desirably "Lexan," is continuously fitted into the channel and secured adhesively in place. The lower edge of the panel 42 does not touch the vehicle body but is made complementary in shape to it.

An additional sealing and cushioning strip like the strip 40 is adhesively secured along the lower margin of the front panel 42 for cushioning and sealing engagement with the truck body.

At the rear end of the canopy, a rear panel 44 similar to the panel 42, but composed of the same translucent, tinted plastic as the member 26, is similarly connected to the member 26 through a channeled resilient strip (not showh) like the strip 40. A window opening is provided in the panel 44 for access of passengers and materials. The window opening is normally closed by an outwardly swinging window 46 which includes a pane 48. The pane 48 is composed of the same tough, transparent, tinted plastic as the members 26 and 44. The window pane 48 is dimensioned and shaped to occupy the opening in the member 44 with slight but comfortably certain clearances. In closed condition it is maintained in co-planar relation with the member 44.

Since the window 48 is designed to fit loosely into an opening formed in the rear panel 44, the panel 44 and the window 48 may advantageously be derived from a common sheet of plastic material.

Strips 50 of neoprene are adhered along the margins of the member 44 which border the ends and the top of the window opening, and protrude inward beyond such margins for a sufficient distance to serve both as a continuous seal, and as a cushioning stop for limiting inward swinging of the window.

The window is supported through a pair of leaf hinges 52. The upper leaf 54 of each hinge is adhered to the outer face of a block 56 of neoprene, the block, in turn, having its inner face adhered to the outer face of the member 44. The lower leaf 58 of each hinge 52 has its inner face adhered to a block 60 of neoprene, the block, in turn, having its inner face adhered to the outer, upper margin of the pane 48.

A strip 62 of neoprene is adhered to the lower outer margin of the pane 48 and is wide enough to protrude below the pane in overlapping relation to the tail-gate for sealing the space between the lower edge of the pane and the upper boundary of the tail-gate.

Provision is made for locking the window 46 closed. A slotted plate 64, adhered to the neoprene strip 62, extends below the pane and the neoprene strip in position to receive a tail-gate carried metallic loop 66. The loop is adapted to receive a padlock. Locking of the pane is, of course, optional, and the locking means can be varied in any way that is practical.

It will be apparent that the canopy as described has many advantages including the following:

1. It affords substantially complete and unobstructed driver vision, night or day, there being no opaque blind spots of substantial dimensions to hinder driver vision.

2. It is light and well organized, and therefore easy to install and to remove as a unit.

3. It involves few parts, is of simple and uncomplicated construction, and can, therefore, be made at reasonable cost.

4. It is attractive in appearance, and dent-proof.

5. It affords complete shelter.

6. It affords a clear unhindered view of the road behind and to the sides for occupants of the tray as well as for the driver of the vehicle.

7. It is rattle-proof.

8. The more fragile parts are well protected against damage.

9. Although the tinted walls do not interfere with the view of occupants of the tray, they afford reasonable privacy for occupants of the tray and substantial concealment for contents of the tray, the principle being the same as that of colored eyeglasses.

I have described what I believe to be the best embodiment of my invention. What I desire to secure by letters patent, however, is set forth in the appended claims:

1. A complete, unitary, camper canopy for pickup trucks having
   a. a top and side wall member composed chiefly of a single piece of strong, tough, tinted, optically transparent plastic, adapted to extend from tray wall to opposite tray wall of the pickup,
   b. a front wall of strong, tough, clear, untinted, optically transparent plastic, adapted to extend from the tray wall to the top of the canopy,
   c. rigid attaching means through which the side walls of the canopy may be continuously marginally attached to the pickup body,
   d. resilient cushioning means continuously interposed between the lower canopy side wall margins and the attaching means and secured to both through adhesion, and
   e. a rear wall composed chiefly of the same, strong, tough, tinted, optically transparent plastic as the top and side wall member, which rear wall extends from the tail gate to the top of the canopy, the cushioning means consisting of strips of deformable, resilient rubbery material, and the rigid attaching means at each side of the canopy consisting of an angle bar that extends substantially the full length of the canopy, each such angle bar having a substantially horizontal web through which connection to the pickup body may be mechanically effected, and an angularly related web having the slope of the associated canopy side wall through which the cushioned connection to the canopy is maintained by adhesion.

* * * * *